Jan. 30, 1968     R. K. KIRBY ET AL     3,365,978
ADJUSTING DEVICE FOR REMOTE CONTROL MANIPULATORS
Filed March 18, 1966     2 Sheets-Sheet 1

INVENTORS.
Roy K. Kirby
BY   Charles D. Wicker

ATTORNEY.

INVENTORS.
Roy K. Kirby
Charles D. Wicker
BY

ATTORNEY.

United States Patent Office 3,365,978
Patented Jan. 30, 1968

3,365,978
ADJUSTING DEVICE FOR REMOTE
CONTROL MANIPULATORS
Roy K. Kirby and Charles D. Wicker, Knoxville, Tenn., assignors to the United States of America as represented by the United States Atomic Energy Commission
Filed Mar. 18, 1966, Ser. No. 536,950
3 Claims. (Cl. 74—501)

The invention described herein was made in the course of, or under, a contract with the U.S. Atomic Energy Commission. It relates generally to remote manipulators, and more specifically to means of adjusting the slaves unit "rest position" of a tape driven remote control manipulator.

Characteristic of commercial remote control manipulators are manipulator tongs having a standard "rest position." By "rest position" is meant that position which the tong assumes when no driving force is applied to the actuating unit by the operator. For example, in typical commercial units the distance between the tong fingers is 3½ inches when the tong is in rest position. In many instances, however, the operation performed by the tong involves gripping and moving articles, the bulk of which are much smaller than this rest position spacing between the tong fingers, thereby requiring substantial movement of the tong fingers before they engage the article. Such movement is wasteful and generally fatiguing to the operator who must apply wasted effort and movement to the actuating unit in moving the tong fingers from their rest position to engage a relatively small article.

If a tong having a smaller distance between its fingers when at rest is used to overcome this problem, it cannot be used on the larger articles which must occasionally be handled. Changing from a smaller tong to a larger one when the occasional larger article is encountered, or the reverse change, is impractical as it also involves much unproductive effort by the operator.

Although reference is made above exclusively to the problem arising from using a tong unit having a distance between its fingers at rest position substantially larger than the bulk of applications to which the tong unit will be applied, it will be obvious to those skilled in the art that the manipulator slave unit may perform other functions in addition to gripping articles, and that in many of these other operations wasted time and energy are also similiarly involved.

It is accordingly the general object of the invention to provide a device for adjustably selecting a rest position of a slave unit in a tape driven remote control manipulator.

Another object of the invention is to provide a device for adjustably selecting the rest position spacing between the fingers of a tape driven tong unit.

Other objects of the invention will become apparent from an examination of the following disclosure of the invention and the appended drawings, wherein.

In accordance with the present invention, a device is provided for adjustably selecting a rest position of the slave unit in a tape driven remote control manipulator. The device comprises a shaft mounted roller cage housing a pair of rollers for engaging the drive tape of the manipulator. Rotation of the roller cage effectively lengthens the distance traveled by the tape drive, thereby causing it to change the rest position of the slave unit. Ratchet means are provided for securing the shaft and roller cage mounted thereon in any desired angular position so as to fix a rest position of the slave unit.

Figure 1:
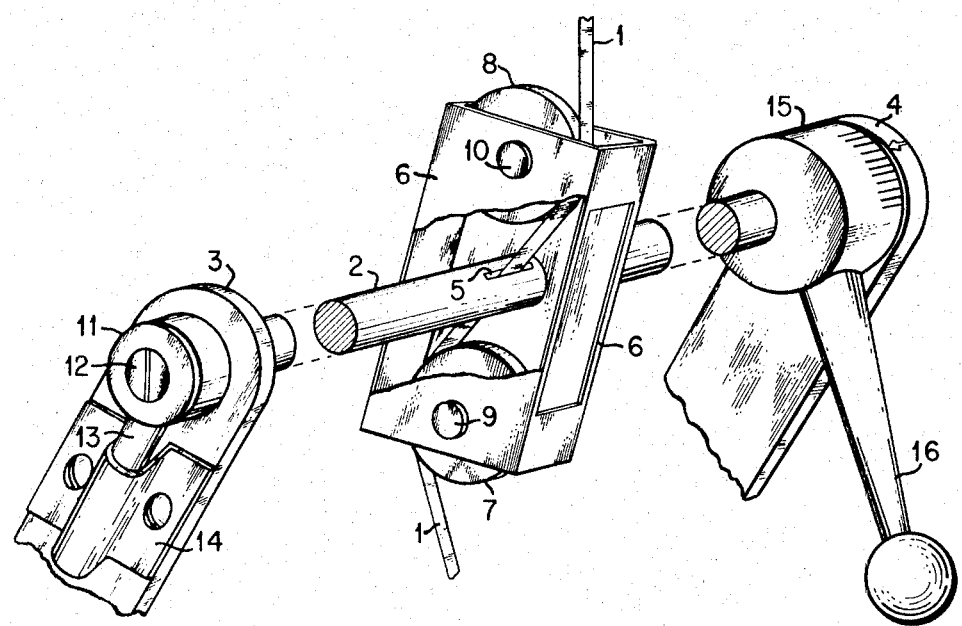
FIG. 1 is an isometric view of a device constructed in accordance with the present invention.

In order to facilitate an understanding of the invention, reference is now made to FIG. 1 of the drawing wherein a preferred embodiment of the present invention is illustrated. A drive tape 1, which may be used to open and close the fingers of a tong, for example, is shown engaged by applicants' device. Positioned in line with tape 1 is a shaft 2 rotatably supported by end brackets 3 and 4. A slot 5 permits tape 1 to pass through shaft 2. Attached to shaft 2 is a roller cage 6 rotatably supporting a pair of rollers or pulleys 7 and 8 which rotate about shafts 9 and 10. Snap rings keep shafts 9 and 10 from sliding out of roller cage 6. Tape 1 passes in front or roller 8 and behind roller 7. The brackets 3 and 4 are attached to the frame of the actuating unit (not shown) of the manipulator.

Attached to shaft 2 outside of bracket 3 is a ratchet head 11, having a ratchet release 12. Shaft 13 extends radially from ratchet head 11, to a bracket 14 which prevents it from rotating with shaft 2. Also attached to shaft 2, adjacent bracket 4, is a collar 15 with a radially extending indexing arm 16. An index scale is engraved on collar 15 to indicate the angular position of shaft 2 and roller cage 6. The angular position is indicated on the index scale where it coincides with the indicator mark on bracket 4.

Figure 2:
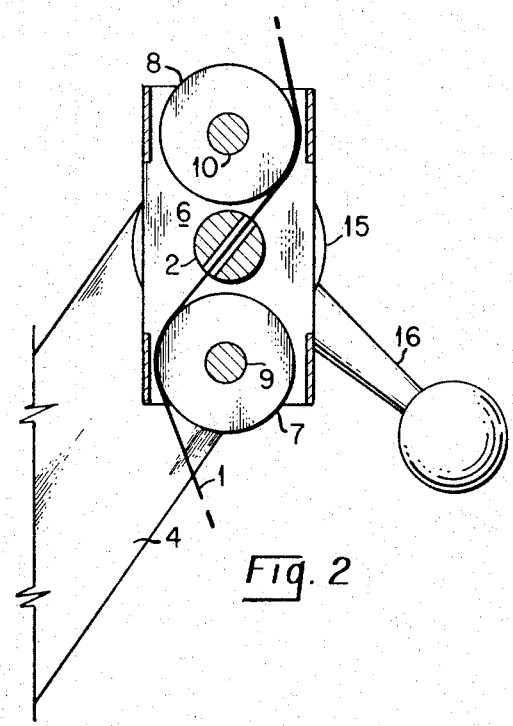
FIGS. 2 and 3 are sectional views of FIG. 1 showing the central roller cage oriented open and closed rest positions, respectively.
Figure 3:
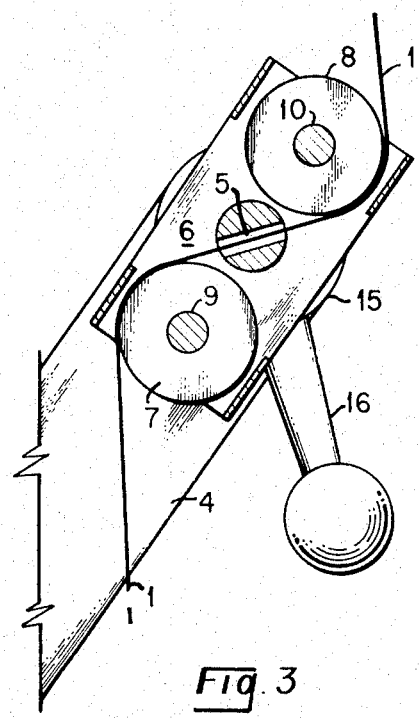

Operation of the device of FIG. 1 may be illustrated by references to FIGS. 2 and 3. In those figures, roller cage 6 is oriented for maximum open and maximum closed slave unit rest positions, respectively. As shown in FIG. 2, drive tape 1 follows the shortest path between the slave unit and actuating unit. In that position the slave unit has a rest position wherein the tong fingers are separated by a maximum distance. By moving indexing arm 16, shaft 2 and roller cage 6 may be rotated to the position shown in FIG. 3. In that position, drive tape 1 must follow a more tortuous path about rollers 7 and 8. This effectively shortens the length of drive tape 1 and causes the end of tape 1 to pull the fingers of the remote tong unit into a partially closed rest postion in comparison with the rest position which would result with the roller cage in the position shown in FIG. 2. A different rest position may be assumed for each angular position of roller cage 6 which can be provided by ratchet head 11. The different angular positions of roller cage 6 and the associated distances between the tong fingers are indicated on the index scale etched on collar 15.

In operation, the operator determines the rest position of the tong fingers which is most convenient for his use. He then sets the rest position of the tong fingers at that value by adjusting indexing arm 16 until the correct corresponding point on the index scale is reached. Only slight movement is then needed by the operator to close the tong fingers from this preselected rest position to grip the desired articles. Tong gap increments of about ⅜ inch are achieved with the particular ratchet used in the present embodiment. Different size increments can be achieved by varying the distance between shafts 9 and 10 which support rollers 7 and 8, or by selecting a ratchet head 11 having a greater number of angular stop settings.

The above description of the invention was intended for illustrative purposes only and should not be interpreted in a limiting sense. For example, the invention could be used on manipulator tapes which perform functions other than driving the tong fingers if a specific bias is required on those tapes. It is intended rather that the scope of the invention be limited only by the claims appended hereto.

What is claimed is:
1. In a remote control manipulator wherein a drive tape is used to transmit driving force from an actuating unit to a slave unit, a device for adjustably selecting a rest position of the slave unit, comprising: a shaft member, means for rotating said shaft member about its axis, means for selectively preventing said shaft member from rotating in at least one direction, a roller cage rigidly fastened to and supported by said shaft member, and first and second roller members having their axes disposed parallel to the axis of said shaft member and spaced apart therefrom in opposite directions, said drive tape engaging and passing between said first and second roller members, whereby rotation of said shaft member and said roller cage displaces said drive tape and thereby shifts the rest position of said slave unit.

2. The device of claim 1 wherein said means for selectively preventing said shaft member from rotating in at least one direction comprises a ratchet member.

3. The device of claim 1 wherein said means for rotating said shaft member about its axis comprises an indexing arm fastened at one end to said shaft and extending radially outward therefrom.

References Cited

UNITED STATES PATENTS

| | | | |
|---|---|---|---|
| 444,843 | 1/1891 | Mohland et al. | 74—491 X |
| 1,149,963 | 8/1915 | Spuhler | 74—501 |
| 1,459,332 | 6/1923 | Hineline. | |
| 2,304,512 | 12/1942 | Stanley | 74—501 X |
| 2,326,714 | 8/1943 | Wholton. | |
| 2,810,411 | 10/1957 | Hallock | 74—501 X |
| 2,956,443 | 10/1960 | Nelson | 280—236 X |
| 2,959,230 | 11/1960 | Doman | 74—491 X |
| 3,129,605 | 4/1964 | Bonnell et al. | 74—507 X |
| 3,139,990 | 7/1964 | Jelatis et al. | 74—501 |
| 3,261,480 | 7/1966 | Haaker et al. | 214—1 |

FOREIGN PATENTS

| | | |
|---|---|---|
| 976,851 | 12/1964 | Great Britain. |
| 366,757 | 8/1939 | Italy. |

FRED C. MATTERN, JR., *Primary Examiner.*

C. F. GREEN, *Assistant Examiner.*